Dec. 3, 1940.  E. L. BROWN  2,223,813
INSECT EXTERMINATOR AND METHOD OF EXTERMINATING INSECTS
Filed Feb. 21, 1938  2 Sheets-Sheet 1
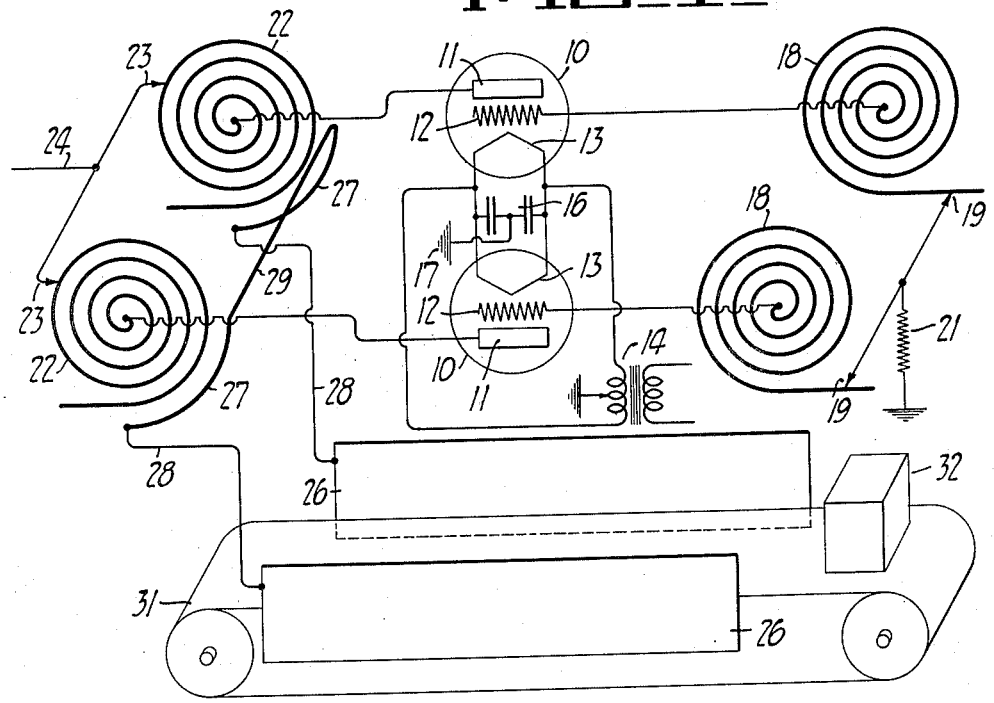
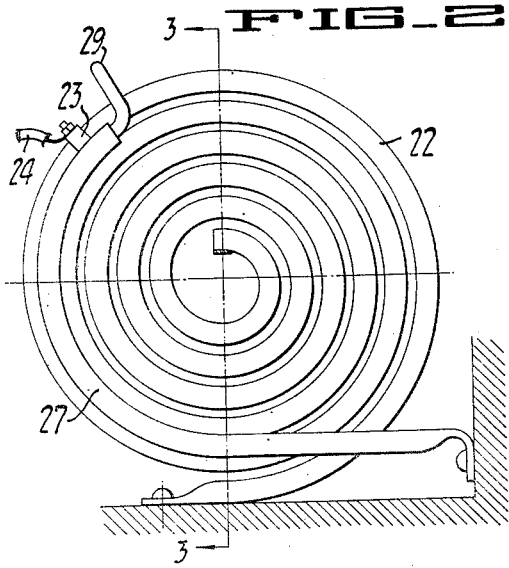 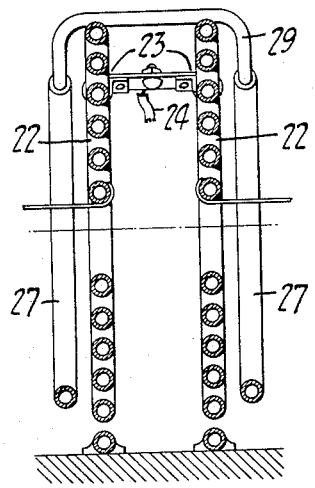
INVENTOR.
Elmer L. Brown
BY Paul D. Flehr
ATTORNEY Dec. 3, 1940.  E. L. BROWN  2,223,813
INSECT EXTERMINATOR AND METHOD OF EXTERMINATING INSECTS
Filed Feb. 21, 1938  2 Sheets-Sheet 2
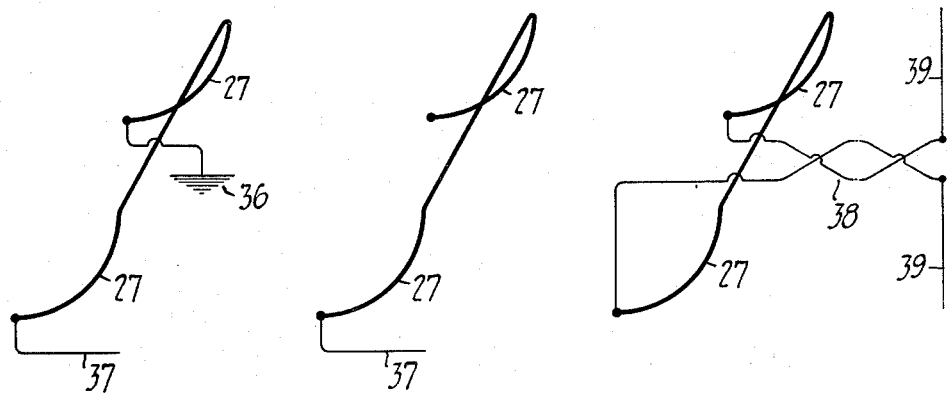
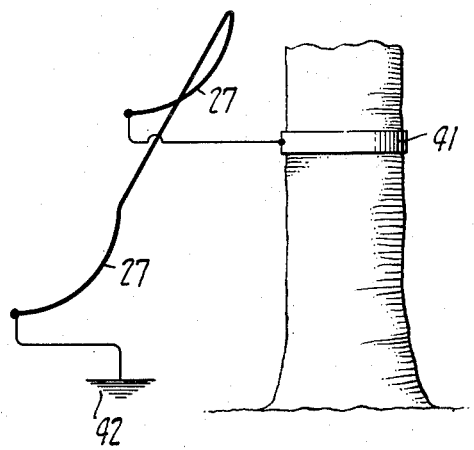
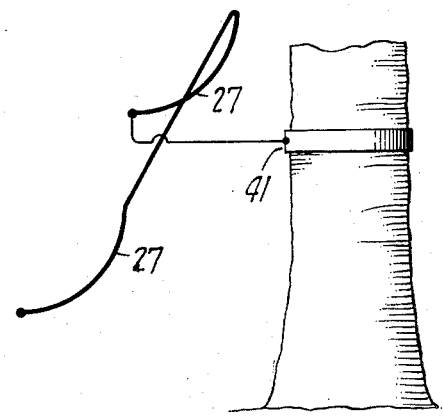
INVENTOR.
Elmer L. Brown
BY
ATTORNEY Patented Dec. 3, 1940

2,223,813

UNITED STATES PATENT OFFICE 2,223,813

INSECT EXTERMINATOR AND METHOD OF EXTERMINATING INSECTS

Elmer L. Brown, San Francisco, Calif., assignor to Joseph B. Smith, San Francisco, Calif., as trustee Application February 21, 1938, Serial No. 191,665

13 Claims. (Cl. 21—54)

This invention relates generally to methods and equipment for the destruction of various insects and lower life organisms. By lower life organisms I have particular reference to the larvae of insects, pupa, eggs, fungi, molds, fermentation, organisms, and bacteria. The invention also relates to stimulating plant growth while destroying destructive pests.

It is an object of the invention to provide a method and apparatus of the above character which will operate electrically, and with greater effectiveness and efficiency than has been heretofore possible.

Referring to the drawings:

Fig. 1 is a circuit diagram showing equipment incorporating the present invention.

Fig. 2 is a side elevational view of the anode coils.

Fig. 3 is a cross-sectional view taken along the line 3—3 of Fig. 2.

In the past it has been proposed to kill insects and lower life organisms by subjecting them to the action of an oscillatory electro-magnetic field. The oscillatory electrical potentials used to create such fields, have been of frequencies of the order of from 1 to 50 megacycles, with all or practically all of the energy being concentrated in a fundamental frequency. High potential equipment making use of "corona" discharge effects, such as generated by apparatus using a spark gap discharge and "Tesla" transformer, has also been proposed. Equipment and methods of this kind have not met with any degree of commercial success, because of the large amount of electrical power required in order to secure a fair degree of destructive power. Furthermore such methods have been effective for only certain species of insects and lower life organisms.

Fundamentally, prior methods operate or are characterized by a thermal or heating effect produced by flow of induced electrical currents. For example in treating grain or cereal by such methods, the grain is heated to an elevated temperature by flow of current through the mass or through the individual grains. Thus such methods have little if any effect on lower order life of minute size or negligible conductivity, and the field of effectiveness if confined to a small space where currents sufficient to cause destructive thermal effects, can be induced.

The present invention is predicated upon my discovery that certain micro waves, together with an ultra high frequency carrier, have a highly efficient destructive effect upon insects and with only incidental thermal effects. I have particular reference to micro waves of the order of from 2 to 6 centimeters, in length. I have found that such micro waves can be generated as dominant harmonics or components, together with carrier frequencies of the order of from 30 to 40 megacycles. I have also found that living vegetation is not injured by reasonable application of such frequencies, but on the contrary its growth is greatly accelerated. The dosage can be such that for the same treatment the growth of the plant is promoted, and insect pests are exterminated.

While it is possible that the type of equipment used may vary, in different instances, the apparatus illustrated gives good results, and is constructed as follows: An electron relay type of oscillator is provided, preferably making use of two electron relays, connected with grid and anode circuits in push-pull relationship. Thus two electron relays or power tubes 10 are shown, and each tube has a conventional anode 11, grid 12, and cathode 13. The cathodes 13 are shown connected in parallel, and to a common cathode current supply 14. A pair of by-pass condensers 16 are shown connected across the cathodes 13, and the middle connection between these condensers is shown connected to ground 17. The grids 12 are shown connected to the two pancake type grid coils 18, in anti-inductive relationship to each other. Each of these coils has a length roughly equal to less than a linear conductor of one-half wave length, but longer than ¼ wave length (wave length of carrier frequency). The outer convolutions of the coils 18 are connected together by the variable taps 19, which in turn are shown connected to ground through the grid biasing resistor 21.

The anodes 11 are connected to the two anode or plate coils 22 (Figs. 2 and 3). These coils are likewise wound spirally or in pancake form, and are in anti-inductive relationship to each other. Their outer convolutions are connected together by adjustable clamps or taps 23, which in turn are connected to the positive B-battery 24. The negative side of the B-battery potential is connected to ground, thus connecting to the cathodes 13. As representative of actual practice, each of the conductors forming the grid and anode coils, for a 4 kilowatt input, can be of ⅜ inch thin-walled copper tubing. The linear length of each conductor can be of the order of 78¾ inches coiled with a total of about 5¼ turns, each turn spaced ⅛ inch from adjacent turn. The two grid coils can be disposed about 1½ inches apart, and the same spacing can be used for the anode coils. The innermost turn of each coil can be of the order of 1⅞ inches, and the last turn of each coil can be of the order of 6¾ inches in diameter. The taps 23 can connect with each anode coil about 13 inches from the outside ends of the conductors. Each of the leads from the inner end of each anode coil, to its associated plate, can be of the order of 11 inches in length. Each of the corresponding leads from the inner ends of the grid coils 18, to the associated grids 12, can be somewhat shorter than the leads to the anodes. The taps 19 for the grid coils can be placed about 11 inches from the outer ends of the coils.

It will be evident that the grid coils 18, together with the leads connecting the same to the grids, form an input or control circuit, capable of being tuned to a definite carrier or fundamental frequency. Connections to the anodes 11, including the coils 22, likewise form an output circuit capable of being sharply tuned to a carrier frequency by adjustment of taps 23. Although the coils 18 may be physically separated a considerable distance from coils 22, sufficient reactive coupling will be afforded between the input and output circuits, by virtue of capacitance between the grid and anodes of the electron relays.

Coupled to the oscillation generator described above, there is electrical applicating means which forms in effect an electrical load. The applicating means may vary in accordance with the extent or character of the electrostatic or electromagnetic field required. In the instance illustrated in Fig. 1, metal applicator plates 26 are employed, and these plates are disposed in generally parallel relationship, whereby an intense electrostatic field is formed between them. In order to couple these applicators to the anode circuit, a pair of relatively short coupling conductors 27 are employed, which have corresponding ends connected to the applicator plates 26 by conductors 28, and their other ends directly connected by a conductor 29.

In practice conductors 27 and 29 can be made of ⅜ inch thin walled copper tubing, having a total length of the order of 30 inches. Each of the conductors 27 constitutes about ½ turn, coupled to the associated anode coil 22, preferably in an anti-inductive or reversed direction. As illustrated in Fig. 3, it is desirable to have the connecting conductor or strap 29 extending parallel to and in the general proximity of the strap connecting to the anode current supply conductor 24.

Where it is desired to treat packaged food products to combat infestation, it is desirable to employ conveying means which will convey the packages of the food product between the applicator plates 26. Thus an endless conveyor 31 is illustrated diagrammatically, and this conveyor serves to carry packages 32 between the applicators.

Other types of applicating means are illustrated in Figs. 4 to 8 inclusive. As illustrated particularly in Fig. 4, the terminal 1 of the one conductor 27 is connected to ground 36, while the terminal of the other conductor 27 is connected to an applicator 37. Conductors 37 may be a rod, plate, or other form of conductor such as may be conveniently used in certain instances. For example in large masses of grain, conductor 37 may be in the form of a rod, to be thrust into the mass of material.

The arrangement of Fig. 5 is unbalanced and uni-polar, in that the terminal of one conductor 27 is open, while the terminal of the other conductor 27 is connected to the applicator 37. Such an arrangement will unbalance the oscillation generator, and will impose a load upon one of the electron relays. To redistribute the load upon the oscillation generator, some form of balancing means should be employed. For example a metal plate, such as one of the order of ½ foot square, and ⅛ inch thick, connected to ground, can be placed in the proximity of the coil connected to the unloaded electron relay, and the exact position varied until the load upon that relay has been increased to equal the load upon the other tube.

Fig. 6 illustrates another arrangement which is desirable when the oscillation generator is located remote from the point of application. In this instance the terminals of conductor 27 are connected to the current feed line 38, which in turn connects to the tuned conductors 39. Conductors 39 in this instance are comparable to a radio antenna, and are tuned to the carrier frequency. An arrangement of this kind can be used in various instances, as for example in field operations where it is desired to rid plants or trees of insect pests, or where one may desire to treat plants or vegetation for the purpose of accelerating plant growth. In general such a radiating antenna will have a relatively large range of effectiveness.

Fig. 7 illustrates another arrangement where it is desired to treat trees or plants, for promoting growth and to eradicate pests. In this instance the terminal of one conductor 27 is connected to a metal band 41, placed about the tree trunk, while the terminal of the other conductor 27 is connected to ground 42. Fig. 8 illustrates substantially the same arrangement as Fig. 7, except that the ground connection has been omitted. In this instance it will be necessary to balance the oscillation generator, in the manner previously described.

The oscillation generator described above is designed for generating ultra high frequencies. For the purposes of this invention I make use of an ultra high frequency of the order of from 30 to 40 megacycles, the preferred range being from 33 to 37 megacycles. I have found that with an oscillation generator constructed as described, and particularly with its inductances proportioned to afford carrier frequencies of the order of from 30 to 40 megacycles, adjustments can be made with respect to taps 19 and 23, so that the oscillation generator produces a dominant harmonic or component micro wave of the order of from 2 to 6 centimeters, at maximum efficiency. The presence of a micro wave, can be readily detected by the use of a neon tube, held between or in the proximity of applicators 26. For example, to adjust the oscillation generator for maximum effectiveness in accordance with the present invention, the grid and anode circuits, including particularly the grid coils 18 and anode coils 22, are adjusted for a frequency of about 35 megacycles, as for example by the use of known calibrating means. To facilitate this initial tuning, I make use of a calibrated center tapped grid coil which is installed in place of the grid coils 18, until the oscillation generator is properly balanced for the fundamental carrier frequency. This grid coil is of a known frequency, as for example 35 megacycles. After adjusting the anode coils 22 for the fundamental frequency, the pancake coils 18 are re-inserted in the circuit, and then adjusted until the desired carrier frequency and desired micro wave are produced, at maximum intensity. A suitable calibrated grid coil which can be used, where the fundamental frequency is 35 megacycles, can be constructed as follows: It can conist of 7 turns of ⅛ inch copper tubing, wound into a helix 1½ inch outside diameter. The turns are spaced so that the total length of the coil is about 2¾ inches. The grid leads are of copper ribbon about 3½ inches in length. The taps on grid coils 18 are then adjusted until a micro wave of the order of from 2 to 6 centimeters is generated, and until this micro wave appears to be of maximum intensity. It will be found that a micro wave of maximum intensity will be produced when the grid circuit is slightly out of tune with the plate circuit, without such de-tuning as to be such as to materially diminish the intensity of the carrier wave generated.

It appears that certain features of the oscillation generator play a part in the attainment of the desired micro wave of maximum intensity. For example it appears that the dead ends, that is, the outer open ends of the grid and anode coils, play a material part in securing the results desired, and dead ends of the order previously indicated, give good results. It also appears that the by-pass condensers 16 to the ground 17, play a part in the production of the desired micro wave. It is deemed probable that the cathode 13, together with the by-pass condensers 16, may form a tuned circuit, having a material effect upon operation of the oscillation generator to generate the desired micro wave.

The electrostatic and electro-magnetic field generated as described above, is highly effective in killing a wide variety of insect life. I have found it effective in quickly killing various weevils, spiders, worms, larvae, pupae and eggs of insects. I have found that without the micro wave, or with a micro wave having little if any intensity, the effectiveness is greatly lessened. In general I find that the killing effect of a carrier wave as described, with the micro wave, is roughly about 20 times greater than electrostatic or electro-magnetic fields created by oscillatory frequencies of the order of 1 megacycle to 50 megacycles. The purpose of the ultra high frequency carrier is to conveniently conduct and radiate the micro wave to the place or places where it is desired. Without this ultra high frequency carrier wave, it would be extremely difficult to generate, conduct and radiate the micro wave to the area or point desired. The voltage and current nodes and anti-nodes of the carrier frequency readily permit transmission by balanced current feed lines, and the use of applicators of convenient size. In other words I can destroy insects by my method and apparatus with about one-twentieth the power required with prior high frequency equipment. While I have not had an opportunity to test my method and apparatus on all forms of lower life, I have reason to believe that it is effective in destroying virtually all such organisms, and I have effectively demonstrated its effectiveness in destroying organisms such as winged insects, termites, hard-shelled insects (beetle, etc.), spiders, crickets, roaches, ants, weevils, fungi, bacteria and molds.

In packing plants it is desirable to prevent infestation of packaged food products, such as bran, flour, cereal and the like. I have found that if such packaged products are passed between the applicators 26, they are effectively sterilized to the extent of destroying any live insects, and all larvae, pupae and eggs. One peculiarity of the method has been noted in treating packaged products of this character. After subjecting a dry de-electric material like cornmeal to the electrostatic field, the material retains an electrostatic charge, and this retained charge has a destructive effect upon insects. The charge is gradually dissipated but in many instances it is retained for periods of several hours.

The length of time required to kill insects depends upon the type of insect involved, and the intensity of the electrostatic or electro-magnetic field. With an oscillation generator of the type described, consuming about one kilowatt of electrical energy, and with the applicators 26 about 3¼ feet long, 10 inches wide, and about 5½ inches apart, weevils placed between the applicators 26 are killed in about from 1 to 15 seconds. At least with respect to insects of appreciable size, the killing power is probably in part due to potential gradients set up in the body of the insect, which causes a break-down in the cell structure. A progressive break-down continues after the power is removed. This can easily be seen in case of a termite. A black spot will appear and become progressively larger until the termite dies within 24 hours. About 1 or 2 seconds of time is sufficient to cause this black spot to appear. A longer application will kill the termite within a few seconds. The amplitude of these micro-waves is quite appreciable so that it is possible that the difference between the node and antinode of an instantaneous potential may reach the value of several hundred volts within a quarter of a wave length, or in other words from ½ to 3 centimeters in length. This, together with extremely high frequency of 5,000,-000,000 to 15,000,000,000 cycles per second of the micro wave can account for its lethal effect.

I claim:

1. In a method for the destruction of insects and lower life organisms, comprising subjecting the insects or organisms to an oscillatory electrostatic field, the field being excited by oscillatory electrical potentials having a wave length of the order of two to six centimeters.

2. In a method for the destruction of insects and lower life organisms, comprising placing the insects or organisms in an oscillatory electrical field, the field being excited by oscillatory electrical potentials having a fundamental wave length together with a dominant micro wave, the micro wave having a wave length of the order of 6 centimeters or less.

3. In a method for the destruction of insects and lower life organisms, comprising subjecting the insects or organisms to an oscillatory electrical field, the field being excited by oscillatory electrical potentials having a carrier frequency of the order of from 30 to 40 megacycles, together with a dominant micro wave having a wave length not greater than about 6 centimeters.

4. In a method for the destruction of insects and lower life organisms, comprising placing the insects or organisms in an oscillatory electrical field, the field being excited by oscillatory potentials having a carrier frequency of the order of from 30 to 40 megacycles, together with a dominant micro wave having a wave length of the order of from 2 to 6 centimeters.

5. In a method for the destruction of insects and lower life organisms, comprising subjecting the insects or organisms to an oscillatory electrical field, the field being excited by oscillatory electrical potentials having a carrier frequency of the order of from 33 to 37 megacycles, together with a dominant micro wave of the order of from 2 to 6 centimeters.

6. In a method for the destruction of insects and lower life organisms where the insects or organisms infest food products like bran, flour, cereal, and the like, subjecting the infested food product to an oscillatory electrical field, the field being excited by oscillatory electrical potentials having a carrier frequency of the order of from 33 to 37 megacycles, and a dominant micro wave of from 2 to 6 centimeters.

7. In a process for the sterilization of packaged food products, such as packaged bran, flour, cereal and the like, comprising placing the packaged products in an oscillatory electrostatic field, the field being excited by oscillatory electrical potentials having a carrier frequency of the order of from 33 to 37 megacycles, and having a dominant micro wave of the order of from 2 to 6 centimeters.

8. In apparatus of the character described, electron relay means having grid, anode and cathode elements, and means forming reactively coupled anode and grid circuits for said electron relay means, the reactance values of said input and output circuits being adjusted to cause generation of a carrier wave and a dominant micro wave having a wave length not greater than about 6 centimeters, and applicating means coupled to at least one of said circuits, whereby oscillations generated are caused to create an electrical field destructive to insects and lower life organisms.

9. In apparatus of the character described, electron relay means including anode, grid and cathode elements, separate grid and anode circuits connected to said electron relay means, said circuit including reactances and being reactively coupled together for generation of oscillations, means for adjusting the reactance values of such circuits whereby a carrier frequency of the order of from 30 to 40 megacycles is generated, together with a dominant micro wave of the order of from 2 to 6 centimeters, and means coupled to one of said circuits for causing said oscillations to excite an electrical field, the field being destructive to insects and lower life organisms.

10. In insect exterminating apparatus of the character described, an oscillation generator capable of generating a carrier frequency of the order of from 30 to 40 megacycles together with a micro wave of the order of from 2 to 6 centimeters, and applicating means forming an output load for the generator, said means including an antenna system tuned to the carrier frequency.

11. In insect exterminating apparatus of the character described, an oscillation generator capable of generating a carrier frequency of the order of from 30 to 40 megacycles together with a micro wave of the order of from 2 to 6 centimeters, and applicating means forming an output load for the generator, said means including a conductive connection to a tree or plant.

12. In insect exterminating apparatus of the character described, an oscillation generator capable of generating a carrier frequency of the order of from 30 to 40 megacycles together with a micro wave of the order of from 2 to 6 centimeters, and applicating means forming an output load for the generator, said means including a single conductive applicator and reactive means for coupling the same to the oscillation generator, said reactive means being open circuited.

13. In insect exterminating apparatus of the character described, an oscillation generator capable of generating a carrier frequency of the order of from 30 to 40 megacycles together with a micro wave of the order of from 2 to 6 centimeters, and applicating means forming on output load for the generator, said means including a conductor adapted to be directly attached to a tree or plant.

ELMER L. BROWN.